D. W. JONES.
STEERING GEAR FOR AUTOMOBILES.
APPLICATION FILED MAY 5, 1922.
1,429,142.
Patented Sept. 12, 1922.
3 SHEETS—SHEET 3.
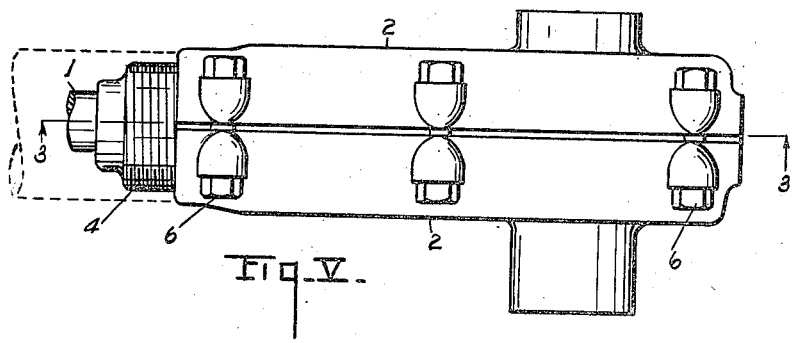
Fig. V.
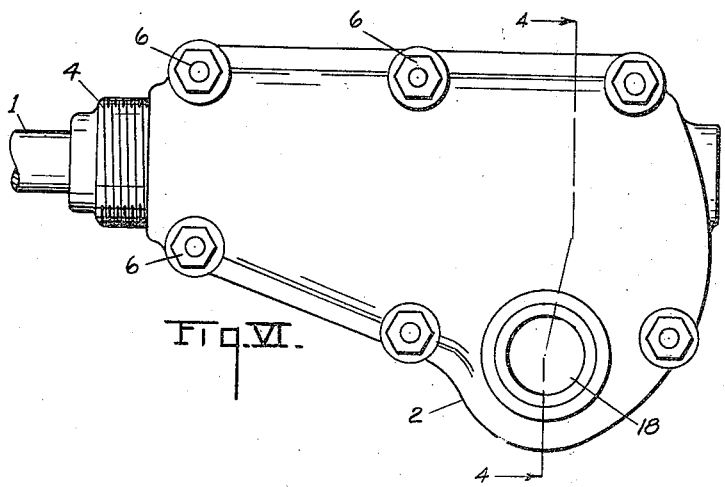
Fig. VI.
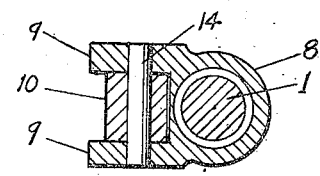
Fig. VII.
INVENTOR.
David W. Jones
By Chappell & Earl
ATTORNEYS Patented Sept. 12, 1922.

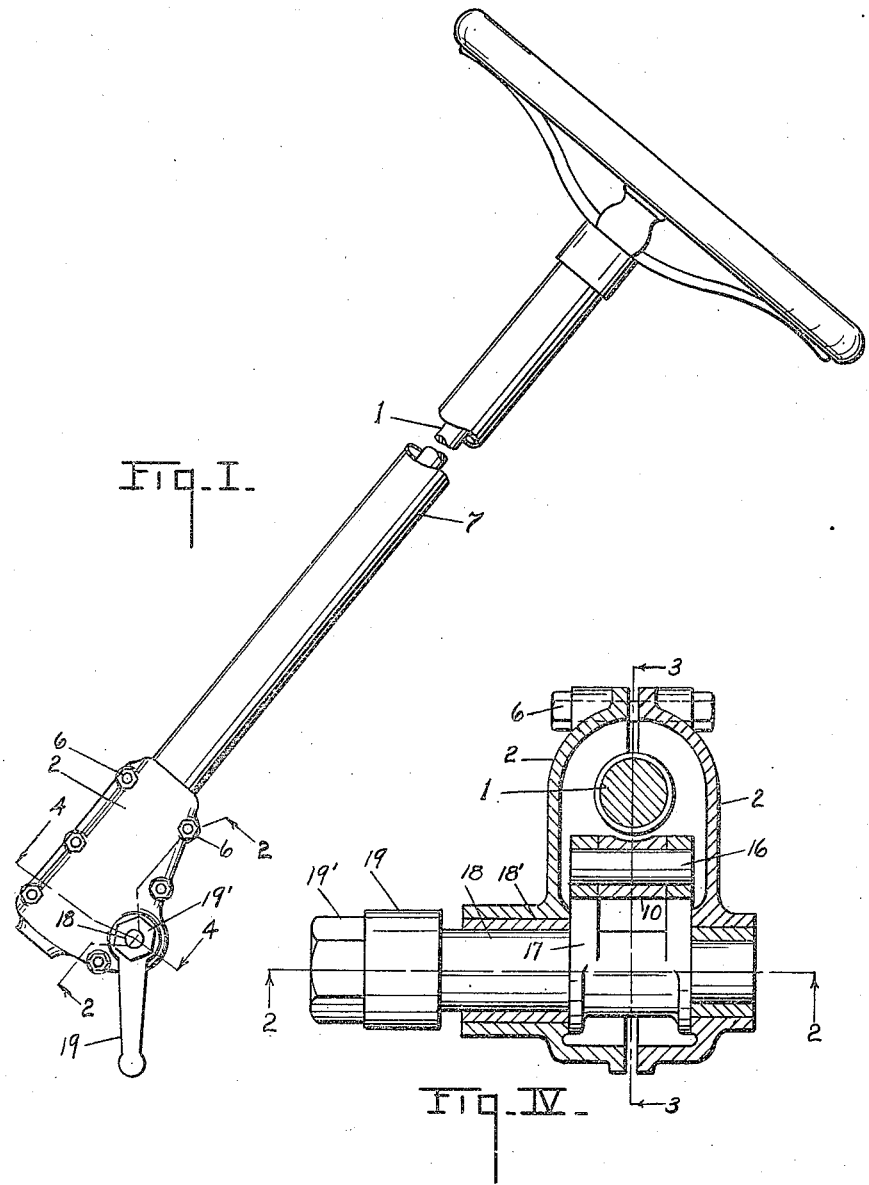

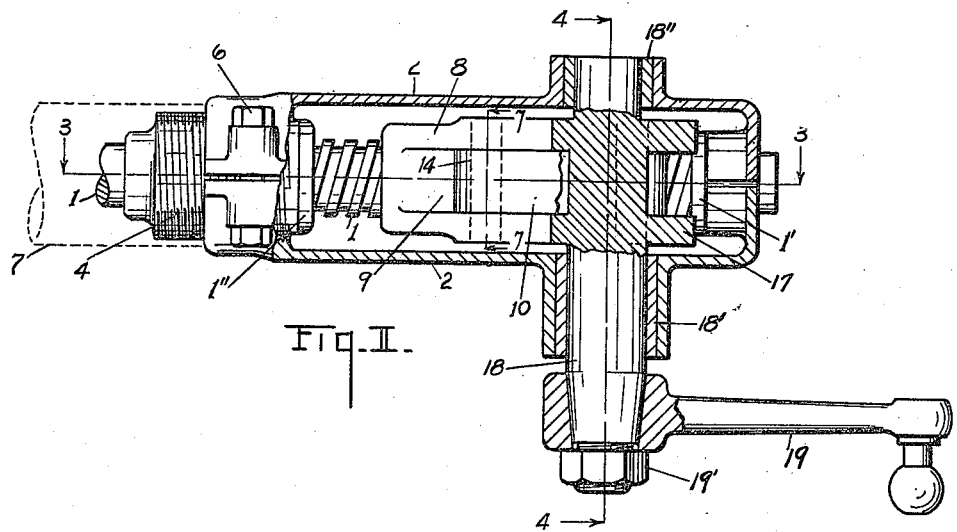
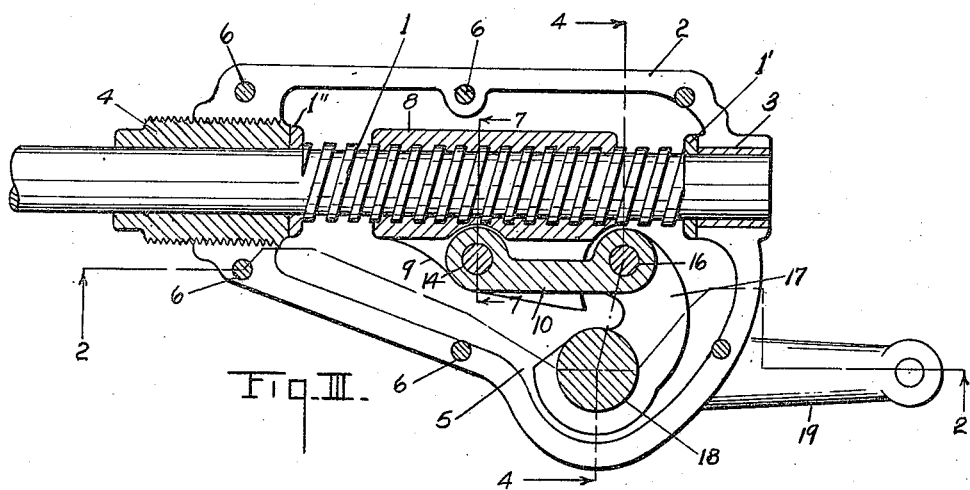

1,429,142

UNITED STATES PATENT OFFICE.

DAVID W. JONES, OF CHICAGO, ILLINOIS.

STEERING GEAR FOR AUTOMOBILES.

Application filed May 5, 1922. Serial No. 558,735.

*To all whom it may concern:*

Be it known that I, DAVID W. JONES, a citizen of the United States, residing at Chicago, county of Cook, State of Illinois, have invented certain new and useful Improvements in Steering Gears for Automobiles, of which the following is a specification.

This invention relates to an improved steering gear for automobiles. It relates particularly to the screw and its connection from the steering column shaft to the steering rockshaft.

The main object of the invention is to provide a simple link connection from the actuating nut to the rocker arm connection to the steering rockshaft.

Objects pertaining to details and economies of construction and operation will definitely appear from the detailed description to follow.

I accomplish the objects of the invention by the devices and means described in the following specification. The invention is clearly defined and pointed out in the claims.

A structure which is a preferred embodiment of the invention is clearly illustrated in the accompanying drawing forming a part of this application, in which:

Fig. I is a side elevation view of the lower portion of a steering column with my improved structure in position, the column being in broken section.

Fig. II is an enlarged detail sectional view on the oblique irregular section line 2—2 of Figs. I, III and IV.

Fig. III is a vertical longitudinal sectional elevation view, portions being shown in full line, taken on line 3—3 of Figs. II, IV and V.

Fig. IV is an enlarged detail transverse sectional view taken on the irregular line 4—4 of Figs. I, II, III and VI.

Fig. V is a detail plan view of the casing structure showing the method of uniting the halves of the divided casing together.

Fig. VI is a side elevation view of the casing structure appearing in Fig. V.

Fig. VII is an enlarged detail transverse sectional view through the adjusting screw and nut and connecting link taken on line 7—7 of Figs. II and III.

In the drawings the sectional views are taken looking in the direction of the little arrows at the ends of the section lines and similar numerals of reference refer to similar parts throughout the several views.

The numbered parts of the drawing will be considered by their numbers. 1 is the screw at the lower end of the steering shaft, the same being carried by suitable split casing 2. The shaft terminates in a journal carried in a suitable journal bearing 3 at its lower end and in a journal in the journal bearing bushing 4 at its upper end. The bushing 4 is screw threaded externally to adjustably engage within the casing. The casing has a laterally projecting chamber 5 at one side to receive the rocker shaft and its arm. The halves of the casing are held together by the screws or bolts 6 and the shell 7 of the steering column is screw threaded to engage upon the threaded bearing bushing 4 to which it is suitably locked. Washers 1' and 1" are at each end of the screw 1 and serve as locating shoulders to engage the bearing bushings 3 and 4.

8 is the elongated steering gear nut adapted to travel back and forth on the screw 1 as the shaft is rotated. The nut has a pair of longitudinal guiding ribs 9, 9 with opposed parallel faces. A link 10 is disposed between the said faces, its opposite faces fitting and conforming thereto whereby the link is guided and maintained against lateral movement.

A pivot pin 14 connects the upper end of the link 10 to the nut extending through the sides of the guiding ribs 9. A pivot pin 16 connects the lower projecting end of the link to the bifurcated arm 17 of the rocker shaft 18,—see Figs. III and IV. The rocker shaft 18 is supported in suitable bearing bushings 18' and 18" in the sides of the divided casing 2.

A rocker arm 19 is secured to the end of the rocker shaft 18 by the usual lock nut 19' for the steering link connection.

From this description it will be seen that there is very intimate connection between the longitudinal nut and the connecting link to the rocker arm 19. The parts fit together very closely and are very effectively kept in line so that there is no lost motion from side to side movement. The elongated nut effectively fitting the screw prevents lost motion between these parts, particularly when the chamber around the same is filled with oil or grease.

The actuating parts may be variously encased. I have shown a simple divided casing because it provides an effective support for the rocker shaft and the same is very readily connected and supported in the chassis of an automobile.

Having thus described my invention, what I claim as new and desire to secure by Letters Patent, is:

1. In a steering gear means for an automobile, the combination of a suitably divided casing, a steering shaft and a screw suitably journaled therein, a transversely disposed rocker shaft suitably journaled in the said casing, an elongated nut on the said screw having elongated parallel guide projections at one side of said nut with opposed parallel faces, a link with its opposite sides parallel adapted to fit between the said guides and be engaged thereby on the said nut and suitably pivoted thereto at the upper end, and a rocker arm on the said rocker shaft with its end embraced by the downwardly projecting ends of the said link, coacting as described for the purpose specified.

2. In a steering gear means for an automobile, the combination of a casing, a steering screw suitably supported therein, a transversely disposed rocker shaft suitably journaled in the said casing, an elongated nut on the said screw having elongated parallel guide projections at one side of said nut with opposed parallel faces, a link with its opposite sides parallel adapted to fit between the said guides and be engaged thereby on the said nut and suitably pivoted thereto at the upper end, and a rocker arm on the said rocker shaft with its end embraced by the downwardly projecting ends of the said link, coacting as described for the purpose specified.

3. In a steering gear for an automobile, the combination with the steering shaft of a screw at the end thereof supported in suitable journal bearings, an elongated nut thereon with elongated parallel guide projections at one side of said nut with opposed parallel faces, a link with its opposite sides parallel adapted to fit between the said guides and be engaged thereby, a pivot pin therethrough, and connections from the lower end of the link to actuate the steering gear when the screw is rotated.

In witness whereof, I have hereunto set my hand and seal.

DAVID W. JONES. [L. S.]